US012665849B2

(12) United States Patent
Mahalingam et al.

(10) Patent No.: US 12,665,849 B2
(45) Date of Patent: Jun. 23, 2026

(54) SYSTEMS AND METHODS FOR OPTIMIZED PROTOCOL AWARE DYNAMIC CONTROL PLANE POLICING

(71) Applicant: DELL PRODUCTS L.P., Round Rock, TX (US)

(72) Inventors: Venkatesan Mahalingam, Pleasanton, CA (US); Senthil Kumar Ganesan, San Ramon, CA (US); Vinoth Kumar Arumugam, Fremont, CA (US); Ashok Daparthi, Santa Clara, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/419,495

(22) Filed: Jan. 22, 2024

(65) Prior Publication Data

US 2025/0240242 A1      Jul. 24, 2025

(51) Int. Cl.
H04L 47/11          (2022.01)
H04L 47/122        (2022.01)
H04L 47/2425      (2022.01)

(52) U.S. Cl.
CPC .......... H04L 47/115 (2013.01); H04L 47/122 (2013.01); H04L 47/2433 (2013.01)

(58) Field of Classification Search
CPC ... H04L 47/115; H04L 47/122; H04L 47/2433
USPC ........................................................ 709/224
See application file for complete search history.

(56) References Cited

U.S. PATENT DOCUMENTS

| | | | |
|---|---|---|---|
| 10,193,807 B1 * | 1/2019 | Atlas ........................ | H04L 47/10 |
| 11,888,731 B1 * | 1/2024 | Bhawsar .................. | H04L 45/24 |
| 2012/0195198 A1 * | 8/2012 | Regan .................. | H04L 41/0894 370/235 |
| 2018/0234297 A1 * | 8/2018 | Wang ........................ | H04L 47/20 |
| 2019/0116125 A1 * | 4/2019 | Singh .................... | H04L 47/323 |
| 2020/0382359 A1 * | 12/2020 | Rao ........................ | G06F 40/279 |
| 2022/0131784 A1 * | 4/2022 | Murakami .............. | H04L 45/04 |
| 2022/0210225 A1 * | 6/2022 | Shilimkar ........... | H04L 12/4633 |
| 2023/0030452 A1 * | 2/2023 | Lal ........................... | H04L 47/32 |
| 2024/0427896 A1 * | 12/2024 | Shroff ................... | G06F 21/575 |

* cited by examiner

*Primary Examiner* — Moustafa M Meky
*Assistant Examiner* — Kidest Mendaye
(74) *Attorney, Agent, or Firm* — BAUGH LAW, LLC

(57)          ABSTRACT

Control plane policing (CoPP) is a mechanism to police incoming traffic to the control plane for control plane protection and routing stability. Currently, networking switches are statically configured for CoPP limits in hardware/firmware. Such an approach of using a static CoPP limit does not work well in dynamic scenarios where one protocol load could be more than the other. The present patent document discloses embodiments of dynamic CoPP limit derivation. CoPP limits are initially estimated based on protocol configuration and are dynamically updated based on application load. A congestion notification may be sent to a sender to limit a transmission rate. Use of dynamic CoPP limit embodiments have advantages of faster protocol convergence, efficient slow packet processing notification to peer, and effective CoPP drop setting based on application load.

20 Claims, 8 Drawing Sheets

_100_

200

*300*

*305* Protocol Configuration

*310* Dynamic CoPP Enabled protocols?

*315* Keep Static CoPP limits

*320* Configuration Monitoring

*325* Resource Usage Changed?

*330* Resource Monitoring

*335* Is there a change from previous CoPP limit programmed into HW?

*340* Invoke HW Update

*345* Congestion notification to peer desired?

No Action

A

<u>400</u>

_700_

800

SYSTEMS AND METHODS FOR OPTIMIZED PROTOCOL AWARE DYNAMIC CONTROL PLANE POLICING

BACKGROUND

A. Technical Field

The present disclosure relates generally to information handling systems. More particularly, the present disclosure relates to network switches with dynamic control plane policing.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Control plane policing (CoPP) is a mechanism to police incoming traffic to the control plane. CoPP may be used to protect the control plane and ensure routing stability. Currently, networking switches are statically configured for CoPP limits in hardware. Static CoPP limit enforces strict control packet rate for central processing unit (CPU) bound traffic. Such a static CoPP limit does not work well in dynamic scenarios where one protocol load could be more than the other. The uneven load among different protocols can in turn affect an overall protocol convergence and network stability.

Accordingly, it is highly desirable to find new, more efficient ways to implement dynamic control plane policing for improved network performance.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
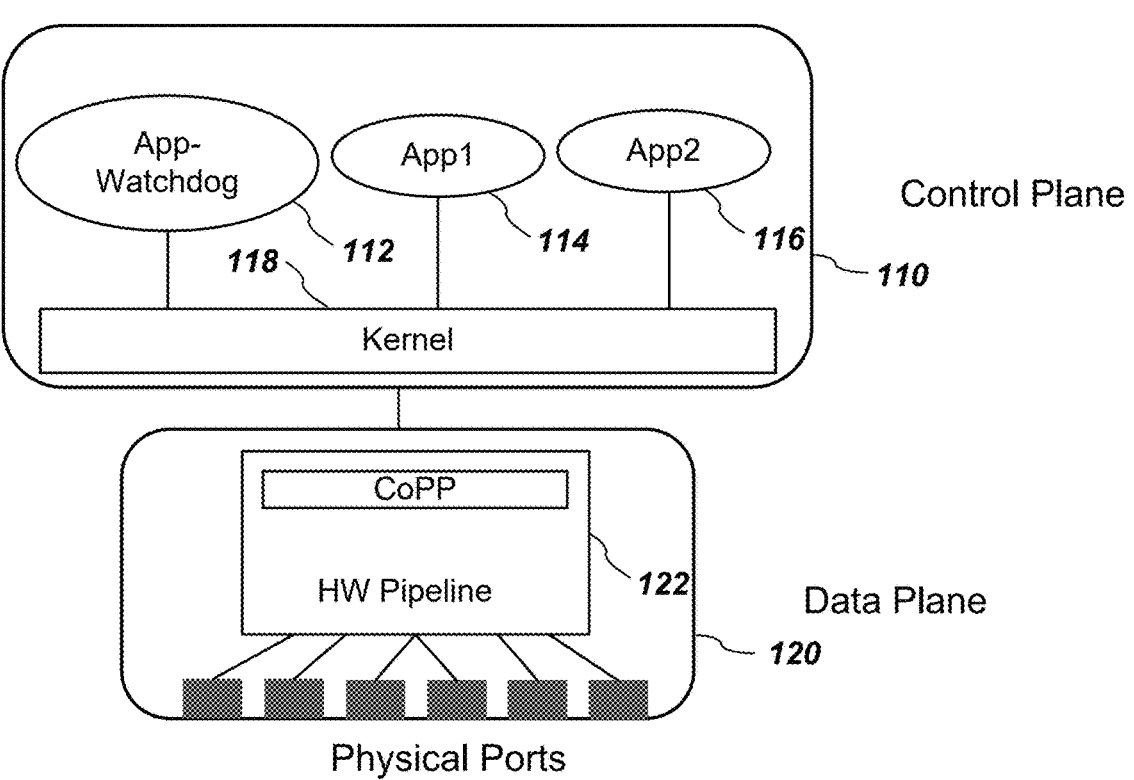
FIG. 1 ("FIG. 1") depicts a block diagram of a system for dynamic control plane policing implementation, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimized," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

A. Embodiments of Dynamic CoPP Limit Derivation

As described earlier, networking switches are currently statically configured for CoPP limits in hardware. Such a static CoPP limit does not work well in dynamic scenarios where one protocol load could be more than the other. The uneven load among different protocols can in turn affect an overall protocol convergence and network stability. Additionally, networking switch hardware may not be aware of application load. Currently, there is no backpressure handling to limit the CPU intake from networking hardware. In most cases, peers, e.g., different switches, are not explicitly notified about drops and failures in control plane and data plane due to application load, CoPP limit, etc.

Described in this Section are embodiments of dynamic CoPP limit derivation, which may be based on protocol configuration, e.g., number of packets per peer, and/or based on application load, e.g., CPU/GPU usage, memory usage and socket receive buffer depth, etc. Under dynamic CoPP limit implementation, a congestion notification, e.g., an explicit congestion notification (ECN), may be sent to a sender to limit a transmission rate. ECN is an extension to the Transmission Control Protocol (TCP)/Internet Protocol (IP). ECN allows end-to-end notification of network congestion without dropping packets. Advantages of dynamic CoPP limit include, but are not limited to, faster protocol convergence with the help of adaptive CoPP limits, efficient slow packet processing notification to peer, and effective CoPP drop settings based on application load. In one or more embodiments, using hierarchical quality of service (QoS) in a network processing unit (NPU), the CoPP limit for protocols may be maximized in two stages. The first stage guarantees the minimum rate for the protocol, and the second stage shares the maximum rate for multiple protocols.

FIG. 1 depicts a block diagram of a system for dynamic control plane policing implementation, according to embodiments of the present disclosure. The system comprises a control plane 110 and a user plane 120. The control plane 110 is a network component that defines the network topology and controls of the data plane, including activities related to traffic routing and packet forwarding. The data plane 120, also known as a user plane, is the part of a network that carries user traffic. The data plane 120 comprises a hardware pipeline 122 (e.g., an NPU) that communicates to one or more physical ports. Incoming traffic from the data plane to the control plane is regulated by CoPP, which may be configured to permit/deny or rate-limit traffic that goes to the control plane.

In one or more embodiments, a monitoring module (also referred to as "App Watchdog" hereinafter) 112 is incorporated in the control plane 110. The App Watchdog 112 interacts with a kernel 118 of the control plane to monitor scale and load of applications, e.g., application 114 and application 116. The kernel resides in the control plane to perform various tasks, e.g., connecting applications for execution, managing hardware devices, and handling interrupts, etc.

Responsibilities of the App Watchdog 112 include, but are not limited to, monitoring configuration events from applications, performing periodic abnormality checks for CPU/Memory/I/O from an application perspective, dynamically calculating a CoPP limit for an application based on one or more application configurations and/or load(s), programs a CoPP limit into hardware (e.g., a data plane NPU), finetuning the CoPP limit for the application when network resource usage goes beyond certain configured thresholds, setting a new CoPP limit, and/or sending congestion notification to a peer node's application to limit a transmission rate when slow processing at an application level is detected, etc.

Figure 2:
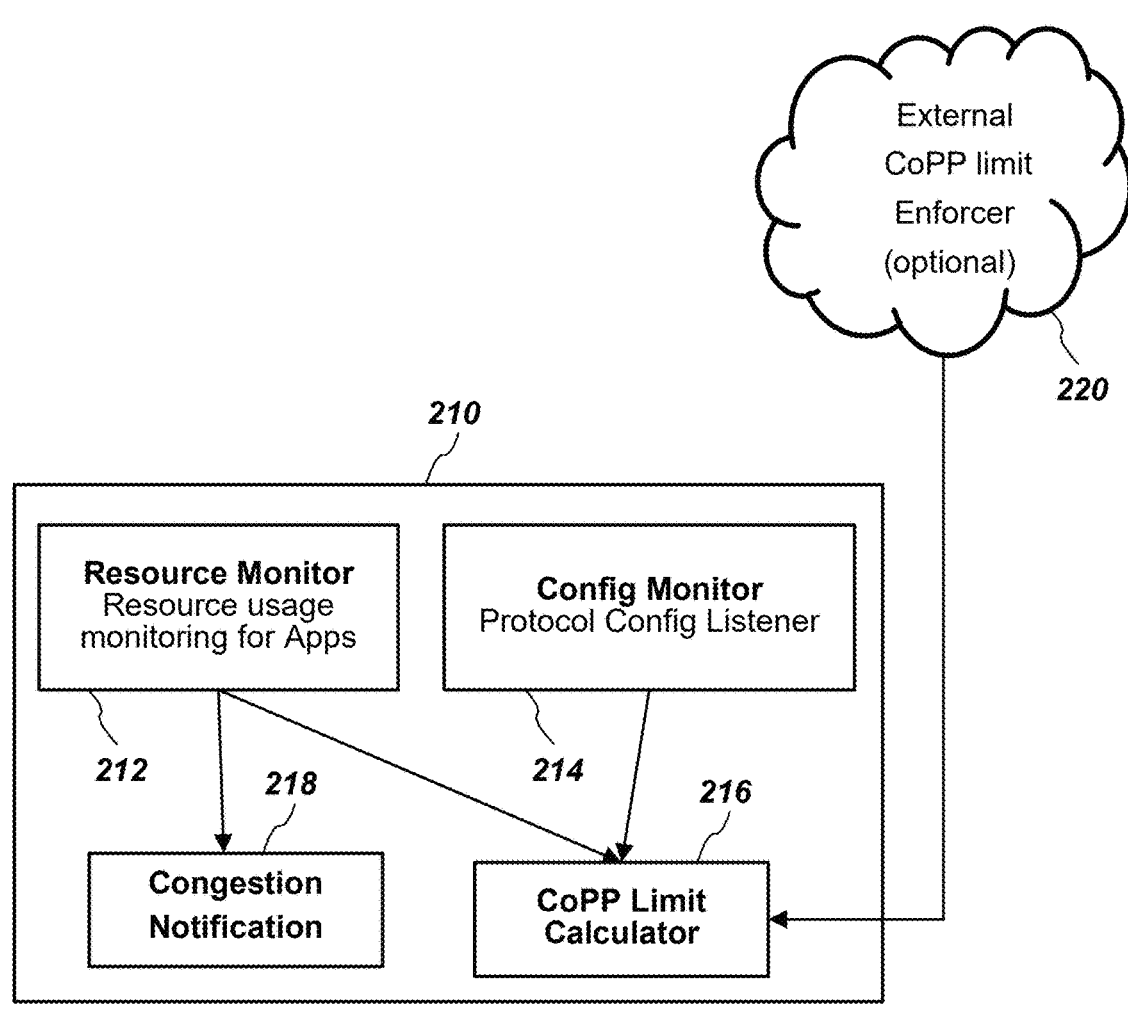
FIG. 2 depicts a block diagram of an application (App) watchdog container, according to embodiments of the present disclosure.

FIG. 2 depicts a block diagram of an App watchdog container, according to embodiments of the present disclosure. The App Watchdog 210 comprises a resource monitoring module 212, a configuration monitoring module 214, a CoPP limit calculator 216, and a congestion notification module 218. The resource monitoring module 212 monitors essential node resources for one or more applications under one or more protocols. The configuration monitoring module 214 tracks configuration changes for one or more protocols. The CoPP limit calculator 216 calculates a CoPP limit based on data fed from the resource monitoring module 212 and the configuration monitoring module 214. Optionally, an external CoPP limit enforcer 220 may overwrite the estimated CoPP limit calculated by the CoPP limit calculator 216 and enforce an externally configured CoPP limit as the CoPP limit for the data plane 120. The congestion notification module 218 infers various data points from the application perspective and determines whether to send a notification, e.g., a priority-based flow control (PFC)/ECN, to a peer.

For example, Border Gateway Protocol (BGP) CoPP limit calculation shall take into consideration the number of control messages exchanged for session establishment and session keepalive, and route information exchange per neighbor. Accordingly, input for BGP CoPP limit calculation may comprise number of BGP neighbors, keepalive timers (to send keepalive messages), route scale (number of update messages), maximum transmission unit (MTU) of a router interface, etc., for the derivation of an approximate CoPP limit as an initial CoPP limit, which is output corresponding to user protocol configurations.

Once the initial CoPP limit is obtained and programmed, further CoPP limits may be adjusted based on resource limit usage by one or more protocol applications. In one or more embodiments, resource usage value may be used to notify backpressure to the peer application via PFC/ECN.

Figure 3:
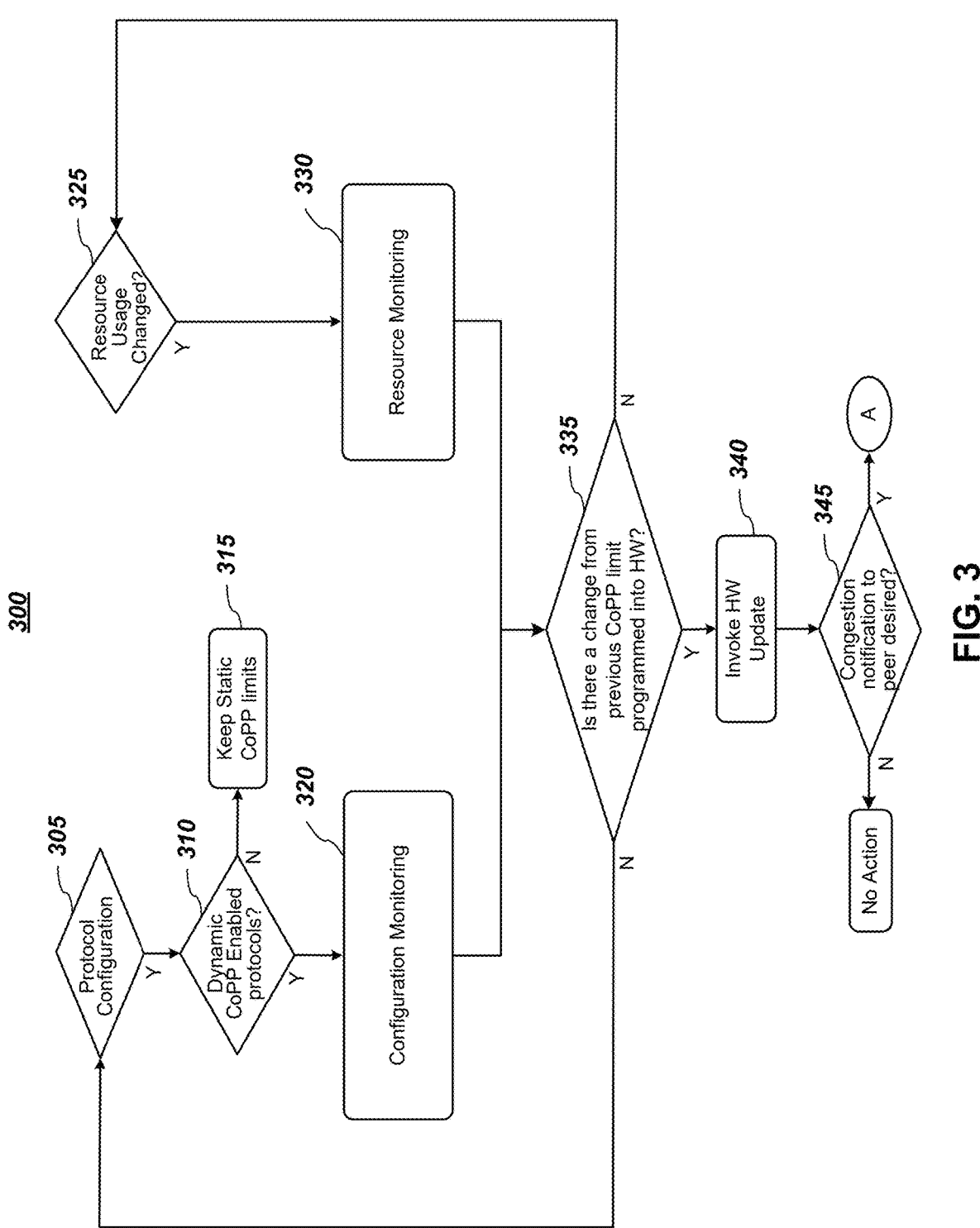
FIG. 3 depicts a flow diagram for CoPP limit tuning, according to embodiments of the present disclosure.

FIG. 3 depicts a flow diagram for CoPP limit tuning, according to embodiments of the present disclosure. In step 305, configuration information for a protocol operating on an information handling system is fetched. In step 310, the protocol is evaluated by the App Watchdog deployed in a control plane of the information handling system for applicability of dynamic CoPP enablement. In step 315, responsive to the protocol not being enabled for dynamic CoPP, a static CoPP limit is kept for the protocol.

In step 320, responsive to the protocol being enabled for dynamic CoPP, configuration monitoring is implemented, by the monitoring module, to derive an initial CoPP limit. For Layer 3 (L3) protocols, the initial CoPP limit may be derived as a product of a number of neighbors, a number of keepalive messages per second, and route update messages based on estimated route scale and MTU. In other words, such an initial CoPP limit may be expressed as:

Initial CoPP limit=<No. of neighbors>x<keep-alive-
msgs-per-second>x<route-update-msgs-based-
on-estimated-route-scale&MTU>

For Layer 2 (L2) protocols, such as Link Aggregation Control Protocol (LACP), the maximum CoPP limit may be derived as a product of a number of L2 protocol enabled interfaces and a number of messages per second. The maximum CoPP limit may be expressed as Max CoPP limit=<L2 protocol enabled interface>x
<No. of msgs per second>.

In step 325, resource usage changes regarding the protocol operation are checked. In step 330, responsive to any resource usage changes being identified, the resource monitoring module may perform one or more specific resource monitoring operations for applicable CoPP limit updates. For L2/L3 protocols, the specific resource monitoring operations may comprise processes of:

checking CPU, graphics processing unit (GPU), and/or memory usage and socket receiving Queue-depth thresholds per protocol;

categorizing the thresholds as low, medium, or high watermarks;

mapping the protocols to watermarks based on resource usage; and applying a multiplier to the initial CoPP limit to obtain an adjusted CoPP limit. The multiplier may be different for different watermarks. For example, the multiplier may have a value of 2 for a low watermark, 1.5 for a medium watermark, or 1 for a high watermark.

In step 335, the App watchdog may verify whether there is a change for the CoPP limit from the initial or previous CoPP limit programmed into the information handling system (e.g., programmed into the hardware/firmware of the information handling system). Responsive to no CoPP limit change, the process goes back to step 305 and step 325 for continuous monitoring. In step 340, responsive to changes in CoPP limit, update to the information handling system (e.g., the hardware/firmware of the information handling system) is invoked. In step 345, the App watchdog may check whether congestion notification to peers is desired.

Responsive to no congestion notification being needed, no further action is taken. Responsive to a congestion notification being needed, the process goes to congestion notifying, as described in detail in FIGS. 4-6 and Section below.

B. Embodiments for Congestion Notification

Described in the Section are embodiments of congestion notification under dynamic CoPP limit derivation. Various ECN techniques may be used to handle backpressure for L3 control packets and to notify the congestion between the IP control packets originator and the receiver. Receiver of ECN/PFC packets performs notification handling for control packets and notifies about the congestion to the control plane. A control plane node infers congestion and limits the rate until it stops getting congestion experienced packets.

Congestion handling may be different at different nodes. For an originator switch, when congestion is experienced at the hardware of the originator switch, the originator switch may notify an application to limit the rate of control packets. For an intermediate switch, when congestion is experienced while forwarding at a data plane, the intermediate switch may follow ECN procedures to notify a destination node and/or follow PFC procedures to notify peer nodes. For a destination node, when congestion is experienced at hardware, the destination node may notify PFC packets from hardware for L2 packets and for IP packets, congestion is expected to be notified from the control plane to the originator as part of keepalive or any control message due for transmission.

Figure 4:
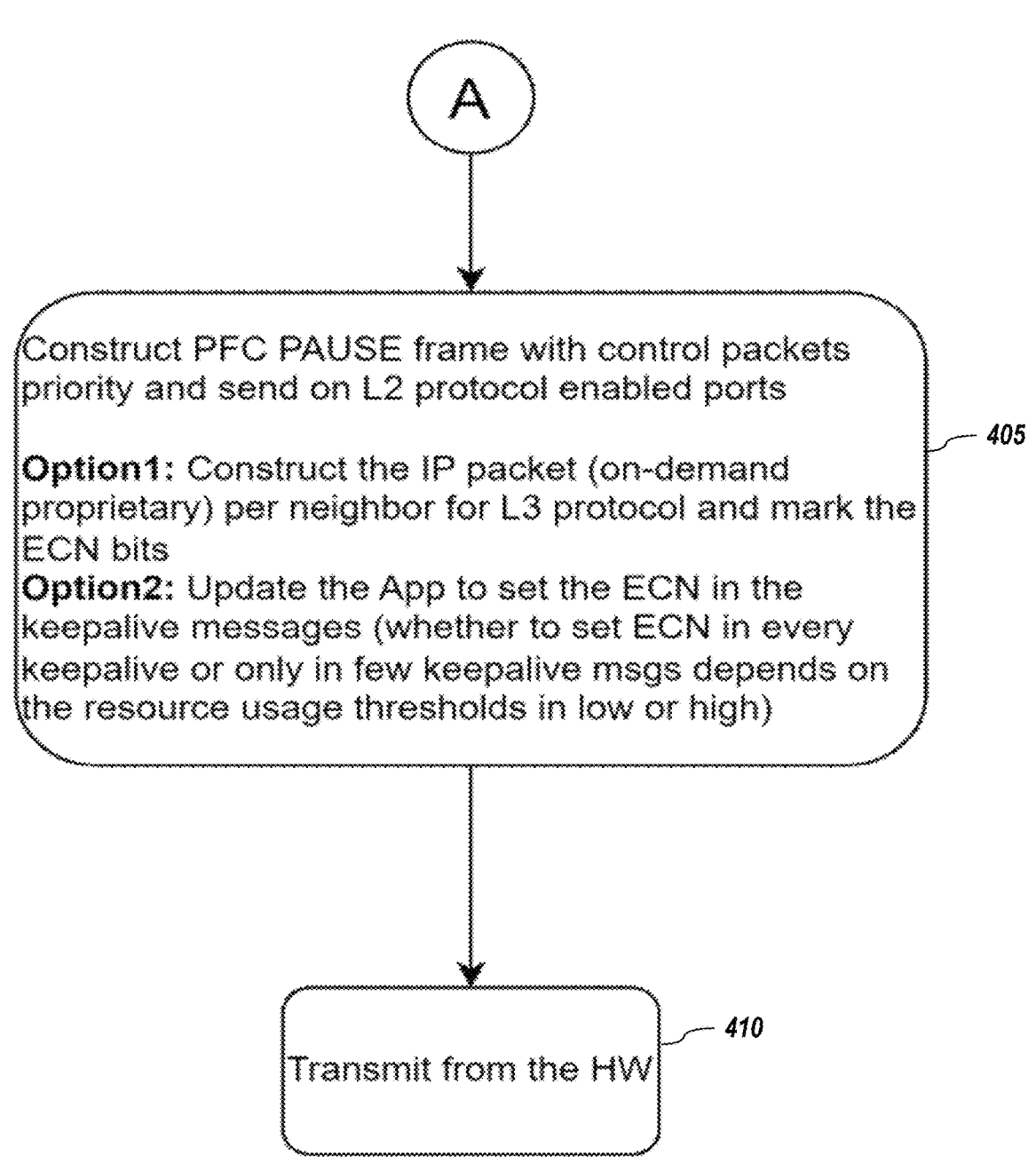
FIG. 4 depicts a flow diagram for congestion notification generation and transmission, according to embodiments of the present disclosure.

FIG. 4 depicts a flow diagram for congestion notification generation and transmission, according to embodiments of the present disclosure. Following step 345 in FIG. 3, responsive to congestion notification to peers being desired, congestion notification is generated and transmitted. In step 405, a congestion notification is constructed regarding the protocol involved in the congestion. If the protocol is an L2 protocol, a PFC pause frame with control packets priority is constructed and sent on one or more L2 protocol enabled ports. If the protocol is an L3 protocol, an IP packet, e.g., an on-demand proprietary IP packet, is constructed with an ECN indicator (e.g., ECN bit(s)) marked per neighbor for L3 protocol. Alternatively, the application involved in the congestion is updated to set the ECN indicator in one or more keepalive messages. The ECN indicator may be set in every keepalive message or only in a few or selected keepalive messages depending on whether resource usage thresholds are low or high. In step 410, the constructed congestion notification is transmitted to a desired peer or node.

Figure 5:
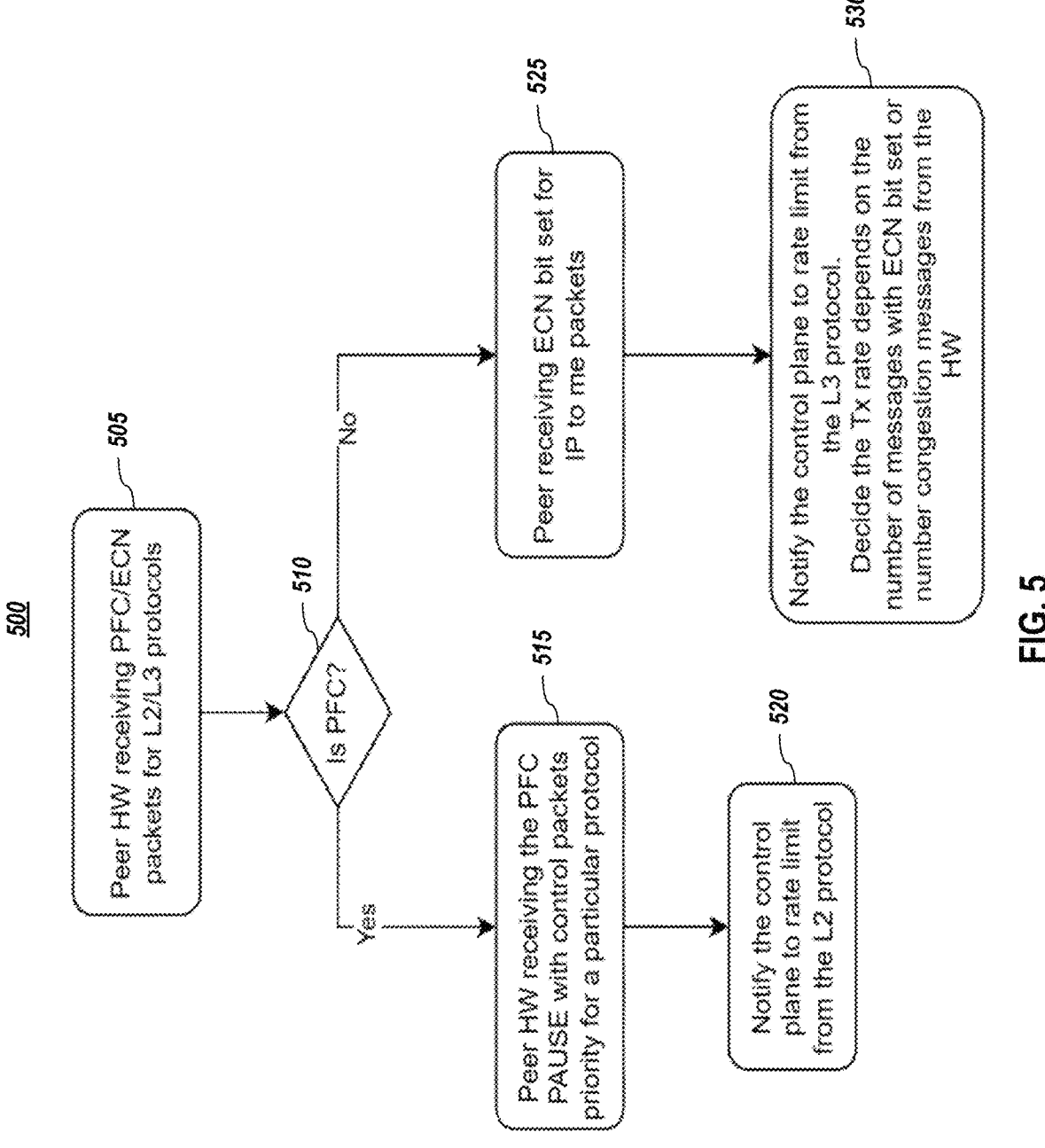
FIG. 5 depicts a flow diagram for congestion notification processing, according to embodiments of the present disclosure.

FIG. 5 depicts a flow diagram for congestion notification processing, according to embodiments of the present disclosure. In step 505, the peer receives the congestion notification. In step 510, the congestion notification is checked whether the congestion notification comprises information related to PFC. In step 515, responsive to the congestion notification being related to PFC, the peer hardware receives a PFC pause frame that has control packets priority for an L2 protocol. In step 520, the peer notifies a control plane to limit control packet intake rate from the L2 protocol.

In step 525, responsive to the congestion notification not being related to PFC, the peer hardware receives the ECN indicators in the IP packets within the congestion notification. In step 530, the peer notifies the control plane to limit control packets intake rate from the L3 protocol (e.g., Internet Protocol (IP)) involved in the congestion notification, and decides a transmission rate, which depends on number of messages with ECN indicators set or number of congestion messages from the peer hardware.

Figure 6:
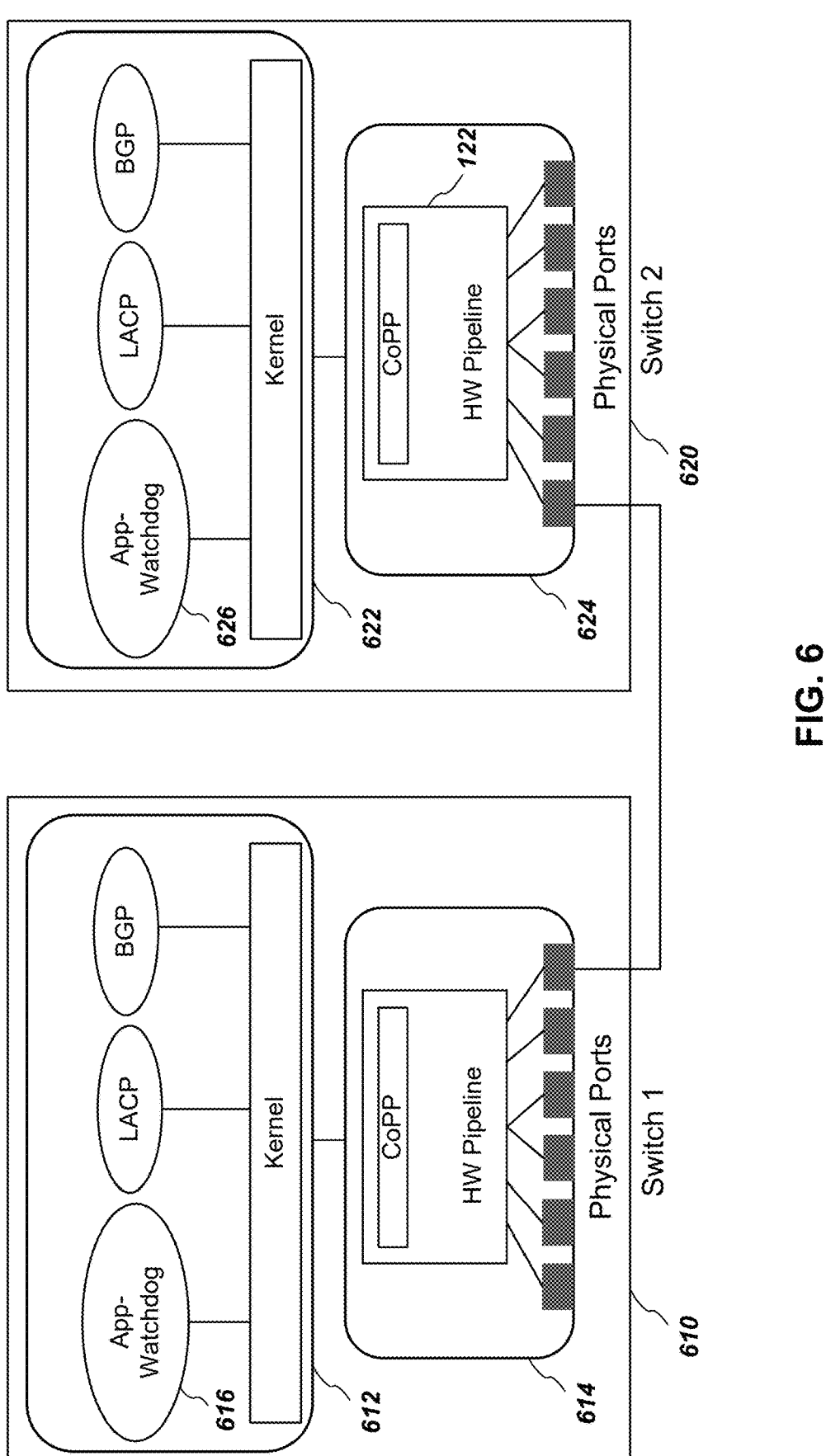
FIG. 6 graphically depicts a topology for CoPP limit programming and congestion notification, according to embodiments of the present disclosure.

FIG. 6 graphically depicts a topology for CoPP limit programming and congestion notification, according to embodiments of the present disclosure. A first switch 610 has a physical port connected to a physical port of a second switch 620. The first switch has a first App Watchdog 616 incorporated in the control plane 612 to manage a first CoPP that regulates incoming traffic from the data plane 614 to the control plane 612. The second switch has a second App Watchdog 626 incorporated in the control plane 622 to manage a second CoPP that regulates incoming traffic from the data plane 624 to the control plane 622.

Described hereinafter is an example of estimating and updating a CoPP limit for LACP (also referred to as an LACP CoPP limit). The first App Watchdog 616 may estimate the initial value of the LACP CoPP limit as:

> Initial CoPP limit=<LACP enabled interfaces, e.g.,
> 48×25G ports as in a S5248 switch>×<LACP
> PDUs per second in case of short interval, e.g.,
> 10>

As such, the initial value of the LACP CoPP limit would be estimated as 480 PPS.

To set a dynamic CoPP limit, CPU, memory, socket, and transmit queue (Tx Q) usage needs to be considered. For example, a resource usage of 0% to 59% would be considered as a low threshold and be assigned a multiplier "2". A dynamic CoPP limit corresponding for such a low threshold would be 2×480=960 PPS. A resource usage of 60% to 79% would be considered as a medium threshold and be assigned a multiplier "1.5". A dynamic CoPP limit corresponding to the medium threshold would be 1.5×480=720 PPS. A resource usage of 80% to 100% would be considered as a high threshold and be assigned a multiplier "1". A dynamic CoPP limit corresponding to such a high threshold would be 1×480=480 PPS. It shall be noted that a resource usage may be referred to as a usage for a single source (e.g., CPU, memory, etc.) or an overall resource usage which may be a combination of each resource usage. In an overall resource usage, single resource usage may or may not be weighted in the combination.

As shown in FIG. 6, the first App Watchdog 616 is configured to handle initial CoPP estimation and dynamic CoPP tuning. A configuration manager in each switch handles user configurations and notifies the user configurations to respective protocol modules (e.g., LACP and BGP modules). A configuration monitoring module in the first App Watchdog 616 monitors protocol configurations, derives an initial CoPP limit, and programs the initial CoPP limit to the hardware of the first switch. Resource usage is also monitored by a resource usage monitoring module within the first App Watchdog 616. Based on resource usage threshold mapping, a dynamic CoPP limit is determined. When the dynamic CoPP limit is different from the initial CoPP limit, the dynamic CoPP limit is programmed into the hardware to overwrite the initial CoPP limit. When desired, a congestion notification in a format of pause frames (for L2 protocols) and/or ECN (for L3 protocols) is sent from the first switch to a peer switch (e.g., the second switch).

The pause frames are used to predefine pause priority to control packets mapping. When the packets reach a peer switch, a hardware pipeline in the peer switch processes the packets and notifies specific protocol (e.g., LACP) congestion. The control plane of the peer switch takes action to reduce transmission rate for control packets regarding the specific protocol. The ECN packets are directly delivered to an application, e.g., the BGP module, to reduce transmission rate. Given that the ECN packets are IP-to-me packets from the hardware, no special programming for processing the ECN packets is needed.

C. System Embodiments

In one or more embodiments, aspects of the present patent document may be directed to, may include, or may be implemented on one or more information handling systems (or computing systems). An information handling system/ computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 7:
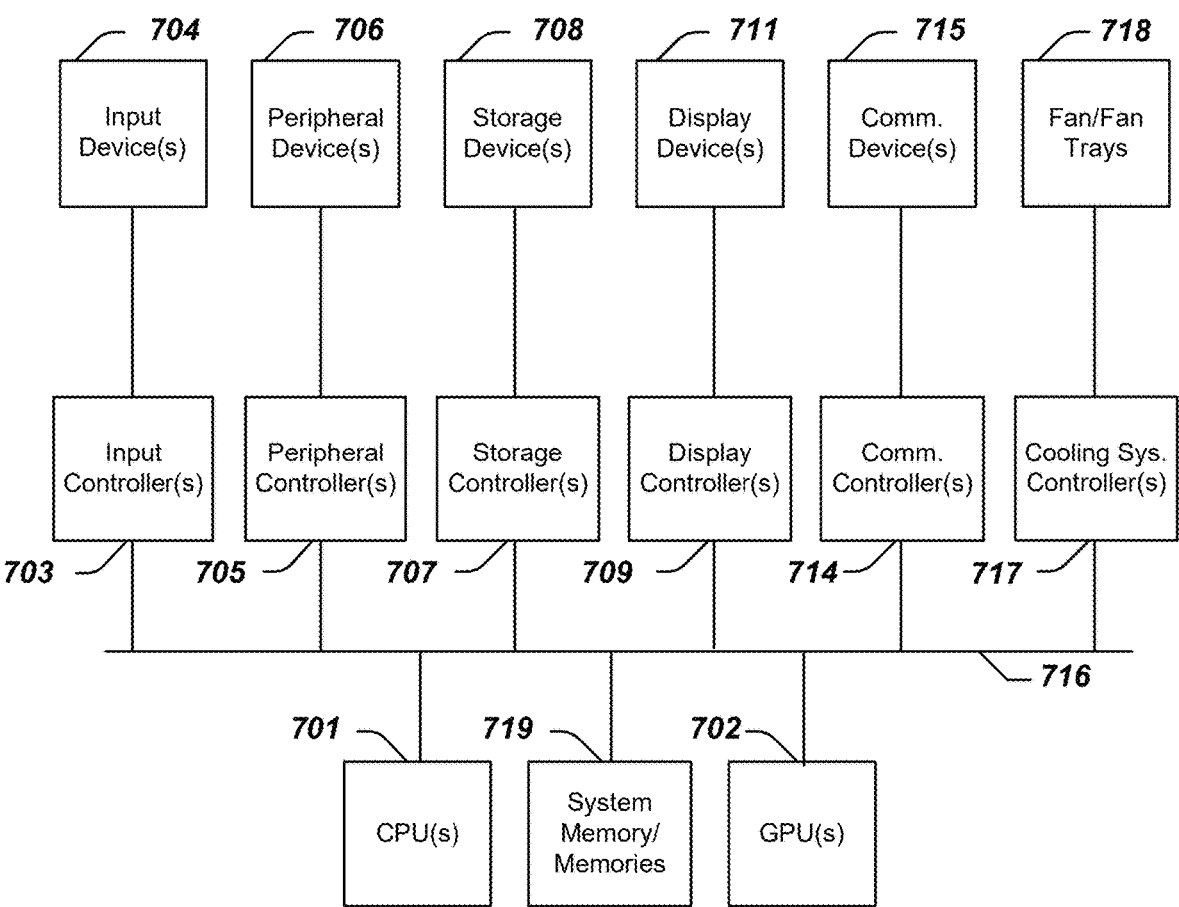
FIG. 7 depicts a simplified block diagram of an information handling system, according to embodiments of the present disclosure.

FIG. 7 depicts a simplified block diagram of an information handling system (or computing system), according to embodiments of the present disclosure. It will be understood that the functionalities shown for system 700 may operate to support various embodiments of a computing system— although it shall be understood that a computing system may be differently configured and include different components, including having fewer or more components as depicted in FIG. 7.

As illustrated in FIG. 7, the computing system 700 includes one or more CPUs 701 that provides computing resources and controls the computer. CPU 701 may be implemented with a microprocessor or the like and may also include one or more graphics processing units (GPU) 702 and/or a floating-point coprocessor for mathematical computations. In one or more embodiments, one or more GPUs 702 may be incorporated within the display controller 709, such as part of a graphics card or cards. The system 700 may also include a system memory 719, which may comprise RAM, ROM, or both.

A number of controllers and peripheral devices may also be provided, as shown in FIG. 7. An input controller 703 represents an interface to various input device(s) 704, such as a keyboard, mouse, touchscreen, stylus, microphone, camera, trackpad, display, etc. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT) display, a thin film transistor (TFT) display, organic light-emitting diode, electroluminescent panel, plasma panel, or any other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fibre Channel over Ethernet (FCOE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 700 comprises one or more fans or fan trays 718 and a cooling subsystem controller or controllers 717 that monitors thermal temperature(s) of the system 700 (or components thereof) and operates the fans/fan trays 718 to help regulate the temperature.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 8:
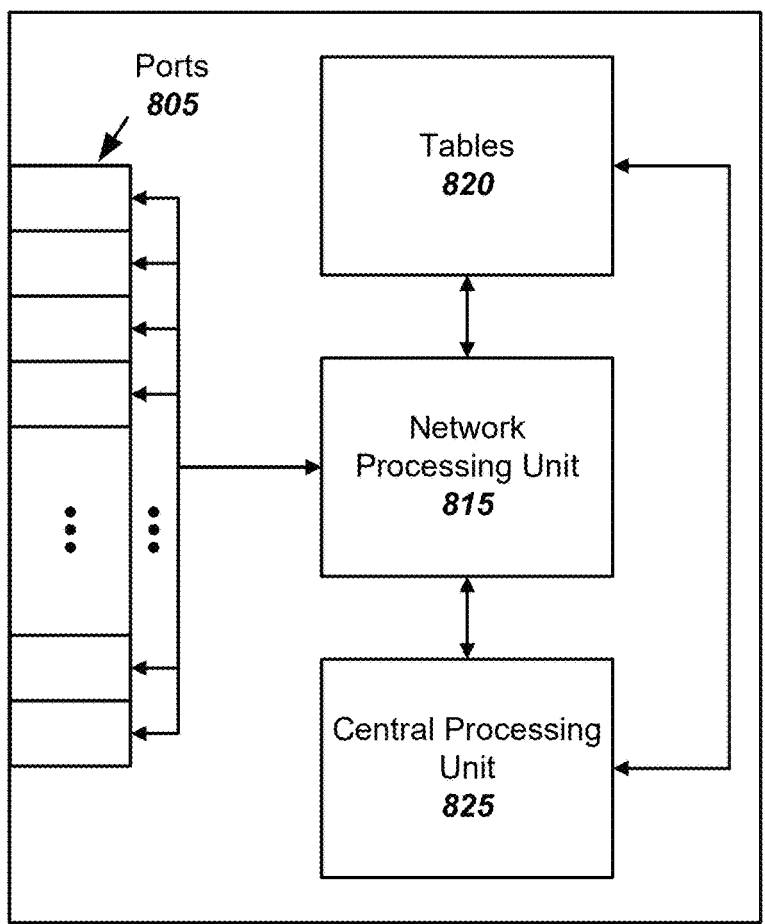
FIG. 8 depicts an alternative block diagram of an information handling system, according to embodiments of the present disclosure.

FIG. 8 depicts an alternative block diagram of an information handling system, according to embodiments of the present disclosure. It will be understood that the functionalities shown for system 800 may operate to support various embodiments of the present disclosure although it shall be understood that such system may be differently configured and include different components, additional components, or fewer components.

The information handling system 800 may include a plurality of I/O ports 805, a network processing unit (NPU) 815, one or more tables 820, and a CPU 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media comprising one or more sequences of instructions, which, when executed by one or more processors or processing units, causes steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. An information handling system comprising:
a data plane comprising a network processing unit (NPU) that is communicatively coupled to one or more physical ports; and
a control plane that controls the data plane for traffic routing and packet forwarding, the control plane comprising a monitoring module to monitor one or more applications operating in the control plane, the monitoring module comprising:
a configuration monitoring module that tracks one or more configurations for each protocol of a set of one or more protocols operating on an information handling system;
a resource monitoring module that monitors, for each protocol of the set of one or more protocols, one or more resources of the information handling system regarding resource usage related to the protocol; and
a control plane policing (CoPP) limit calculator communicatively coupled to the configuration monitoring module and to the resource monitoring module, the CoPP limit calculator, for each protocol of the set of one or more protocols:
determines an initial value of a CoPP limit using one or more protocol-related configurations related to one or more conditions associated with the information handling system's deployment; and
dynamically updates the CoPP limit using at least one or more values related to the resource usage.

2. The information handling system of claim 1 wherein the CoPP limit is programmed, by the monitoring module, into the NPU for operation of the protocol.

3. The information handling system of claim 1 further comprising:
a congestion notification module communicatively coupled to the resource monitoring module, wherein the congestion notification module sends a congestion notification to a peer information handling system when resource usage regarding the protocol indicates a congestion.

4. The information handling system of claim 3 wherein the protocol is a Layer 2 (L2) protocol, and the congestion notification is a priority-based flow control (PFC) pause frame that has control packets priority for the L2 protocol.

5. The information handling system of claim 3 wherein the protocol is a Layer 3 (L3) protocol, and the congestion notification is a packet with explicit congestion notification (ECN) bit or bits set.

6. The information handling system of claim 1 wherein the protocol is a Layer 3 (L3) protocol, and the initial CoPP limit is derived using one or more of a number of neighbors, a number of keepalive messages per second, and a number of route update messages based on estimated route scale and maximum transmission unit (MTU).

7. The information handling system of claim 1 wherein the protocol is a Layer 2 (L2) protocol, and the initial CoPP limit is derived using one or more of a number of L2 protocol enabled interfaces and a number of messages per second.

8. The information handling system of claim 1 wherein the CoPP limit is dynamically updated using steps comprising:
checking resource usage and receiving queue-depth thresholds for the protocol;
categorizing the thresholds as low, medium, or high watermarks;
mapping the protocol to a watermark based on resource usage; and
applying a multiplier related to the mapped watermark to the initial value of the CoPP limit for update.

9. The information handling system of claim 1 wherein the CoPP limit calculator is communicatively coupled to an external CoPP limit enforcer and the CoPP limit is an externally configured CoPP limit enforced by the external CoPP limit enforcer.

10. A processor-implemented method for setting control plane policing, the method comprising:
for an information handling system, which comprises:
a data plane comprising a network processing unit (NPU) that is communicatively coupled to one or more physical ports; and
a control plane that controls the data plane for traffic routing and packet forwarding, the control plane comprising a monitoring module to monitor one or more applications operating in the control plane, the monitoring module comprising:
a configuration monitoring module that tracks one or more configurations for a protocol operating on the information handling system;
a resource monitoring module that monitors one or more resources of the information handling system regarding resource usage related to the protocol; and
a control plane policing (CoPP) limit calculator communicatively coupled to the configuration monitoring module and to the resource monitoring module, the CoPP limit calculator causing steps to be performed comprising:
determining an initial value of a CoPP limit using one or more protocol-related configurations; and
dynamically updating the CoPP limit using at least one or more values related to the resource usage.

11. The processor-implemented method of claim 10 further comprising:
programming the data plane NPU with the initial CoPP limit for operation of the protocol; and monitoring one or more resources of the information handling system regarding resource usage related to the protocol to be used in the step of dynamically updating the CoPP limit.

12. The processor-implemented method of claim 10 wherein:

at least one of the one or more protocol-related configurations related to one or more conditions associated with the information handling system's deployment.

13. The processor-implemented method of claim 10 further comprising:

responsive to resource usage indicating that a congestion notification to a peer information handling system is desired, the information handling system causing steps to be performed comprising:

responsive to the protocol being a Layer 3 (L3) protocol, setting an explicit congestion notification (ECN) indicator in a packet and transmitting the packet to the peer information handling system; and responsive to the protocol being a Layer 2 (L2) protocol, constructing a priority-based flow control (PFC) pause frame and transmitting the PFC pause frame to the peer information handling system.

14. The processor-implemented method of claim 10 wherein:

responsive to the protocol being an L3 protocol, the initial CoPP limit is derived using one or more of a number of neighbors, a number of keepalive messages per second, and a number of route update messages based on estimated route scale and maximum transmission unit (MTU).

15. The processor-implemented method of claim 10 wherein:

responsive to the protocol being an L2 protocol, the initial CoPP limit is derived using one or more of a number of L2 protocol enabled interfaces and a number of messages per second.

16. The processor-implemented method of claim 10 wherein the information handling system further causes steps to be performed comprising:

responsive to receiving from a peer information handling system a congestion notification being related to priority-based flow control (PFC):

receiving a PFC pause frame that has control packets priority for a Layer 2 (L2) protocol; and notifying a control plane of the information handling system to limit control packets intake rate from the L2 protocol; and responsive to receiving from a peer information handling system an explicit congestion notification (ECN) indicator:

notifying the control plane of the information handling system to limit control packets intake rate for a Layer 3 (L3) protocol; and deciding a transmission rate.

17. A non-transitory information-handling-system-readable medium or media comprising one or more sequences of instructions for an information handling system, which comprises:

a data plane comprising a network processing unit (NPU) that is communicatively coupled to one or more physical ports; and a control plane that controls the data plane for traffic routing and packet forwarding, the control plane comprising a monitoring module to monitor one or more applications operating in the control plane, the monitoring module comprising:

a configuration monitoring module that tracks one or more configurations for a protocol operating on the information handling system; and a resource monitoring module that monitors one or more resources of the information handling system regarding resource usage related to the protocol, the one or more sequences of instructions which, when executed by at least one processor, causes a control plane policing (CoPP) limit calculator communicatively coupled to the configuration monitoring module and to the resource monitoring module, to cause steps to be performed comprising:

determining an initial value of a CoPP limit using one or more protocol-related configurations; and dynamically updating the CoPP limit using at least one or more values related to the resource usage.

18. The non-transitory information-handling-system-readable medium or media of claim 17 further comprising one or more sequences of instructions that cause one or more steps to be performed comprising:

programming the data plane NPU with the initial CoPP limit for operation of the protocol; and monitoring one or more resources of the information handling system regarding resource usage related to the protocol to be used in the step of dynamically updating the CoPP limit.

19. The non-transitory information-handling-system-readable medium or media of claim 17 wherein:

at least one of the one or more protocol-related configurations is related to one or more conditions associated with the information handling system's deployment.

20. The non-transitory information-handling-system-readable medium or media of claim 17 further comprising one or more sequences of instructions that cause one or more steps to be performed comprising:

responsive to resource usage indicating that a congestion notification to a peer information handling system is desired, causing steps to be performed comprising:

responsive to the protocol being a Layer 3 (L3) protocol, setting an explicit congestion notification (ECN) indicator in a packet and transmitting the packet to the peer information handling system; and responsive to the protocol being a Layer 2 (L2) protocol, constructing a priority-based flow control (PFC) pause frame and transmitting the PFC pause frame to the peer information handling system.

* * * * *